Patented Dec. 20, 1938

2,140,537

UNITED STATES PATENT OFFICE 2,140,537

AZO COMPOUNDS AND PROCESS FOR COLORING THEREWITH

James G. McNally and Joseph B. Dickey, Rochester, N. Y., assignors to Eastman Kodak Company, Rochester, N. Y., a corporation of New Jersey No Drawing. Application January 14, 1937, Serial No. 120,558

24 Claims.  (Cl. 8—50)

This invention relates to aryl azo barbituric and substituted barbituric acid compounds. More particularly, it relates to nuclear non-sulfonated aryl azo barbituric and substituted barbituric acid compounds having a univalent non-metallic substituent on the aryl nucleus in ortho position to the azo group and their application for the dyeing or coloration of organic derivatives of cellulose. The invention includes new azo compounds, the process of coloring organic derivatives of cellulose therewith and material made of or containing an organic derivative of cellulose colored with the azo compounds of the invention.

Organic derivatives of cellulose are characterized by an indifferent affinity for the usual cotton or wool dyes, especially the ordinary water soluble dyes. Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

In our copending application Serial No. 120,559 filed January 14, 1937, we have shown that nuclear non-sulfonated aromatic azo derivatives of barbituric acid and substituted barbibutric acids produce dyeings, on organic derivatives of cellulose, having unusually good fastness to light and washing. We have further discovered that nuclear non-sulfonated aryl azo derivatives of barbituric acid and substituted barbituric acids having a univalent non-metallic substituent on the aryl nucleus in ortho position to the azo group produce dyeings on organic derivatives of cellulose which are particularly good with respect to light fastness. It may be noted that this discovery forming the subject matter of the present invention is disclosed in our said copending application Serial No. 120,559 but no claims to it are made therein. Employing the ortho substituted barbituric compounds of the invention cellulose acetate silk, for example, can be dyed a variety of colors of outstanding light fastness.

The term "substituted barbituric acids" is intended to be used in its broad sense and includes, for example, compounds such as thiobarbituric acid, 2-iminobarbituric acid, 2-methyliminobarbituric acid, 2-imino-3-cyano-barbituric acid, 6-iminobarbituric acid and 6-iminothiobarbituric acid as more fully set forth hereinafter.

Amines which may be employed in preparing the compounds of our invention include, for example, o-Methoxyaniline.
o-Ethoxyaniline.
o-Propoxyaniline.
o-Chloroaniline.
o-Methylaniline.
o-Nitroaniline.
o-Phenoxyaniline.
o-Methoxy-p-nitroaniline.
o-Ethoxy-p-chloroaniline.
o-Ethoxy-p-methylaniline.
o-Ethoxy-p-nitroaniline.
o-Nitro-p-methylaniline.
o-Nitro-p-ethylaniline.
o-Nitro-p-chloroaniline.
o-Nitro-p-bromoaniline.
o-Nitro-p-fluoroaniline.
o-Nitro-p-methoxyaniline.
2,6-dimethylaniline.
o-$\beta$-Methoxy ethoxy aniline.
o-$\beta$-Hydroxy ethoxy aniline.
2,6-dichloro-4-nitroaniline.
2-nitro-4,6-dichloroaniline.
2,6-dinitro-4-chloroaniline.

The above list of amines is not intended to be exhaustive. By the employment of these amines in accordance with the invention, however, excellent dyes for organic derivatives of cellulose can be prepared as will be fully apparent from the description.

Univalent non-metallic substituents which are of value include, for example, an alkoxy group such as —OCH$_3$, —OCH$_2$CH$_3$ or —OCH$_2$CH$_2$CH$_3$, a nitro group, —OC$_2$H$_4$OH, an alkyl group such as methyl, ethyl or propyl, a halogen atom such as chlorine, bromine or fluorine and an aryloxy group such as phenoxy.

In order that our invention may be completely understood the general formulae of a number of classes of compounds which may be employed in the process of the invention together with specific examples of compounds represented by the general formulae will be given. It will be understood that the compounds disclosed are given for purposes of illustration and are not intended to limit the invention. For purposes of references the formulae are numbered consecutively.

Because the barbituric nucleus is not always numbered the same by all persons, to avoid any possible ambiguity, the numbering followed throughout the specification and claims is given hereinafter in connection with the formulae illustrating the classes of compounds included within the scope of the invention.

A first class of compounds typical of those which may be employed in the process of the invention may be represented by the general formula:

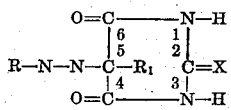

wherein X is O or S, R is a nuclear non-sulfonated aryl nucleus which contains a univalent non-metallic substituent in the ortho position to the azo group, and $R_1$ is hydrogen, alkyl, a nuclear non-sulfonated aryl nucleus or aralkyl. R may contain a substituent, in addition to the one in the ortho position, such, for example, as an alkyl group, an alkoxy group, $-NO_2$, $-OH$, $OC_2H_4OH$ or $-N=N-R_2$, wherein $R_2$ is a nuclear non-sulfonated aryl nucleus.

Advantageously, the aryl nucleus employed in the compounds of the invention is an aryl nucleus of the benzene series. Also, it should be noted that while the presence of a univalent non-metallic substituent on the aryl nucleus in ortho position to the azo group generally improves the dyeing properties it has been found that certain substituents, in given cases, exert a greater beneficial effect than others. To illustrate, the alkoxy and aryloxy groups exert a generally greater effect on the compounds of our invention and especially those represented by the general Formula I, than the other substituents. The effect of the alkoxy and aryloxy groups is most pronounced in the case of barbituric acid. An exception to the general rule just stated exists in the case of thiobarbituric acid, a compound of Formula I. In that case it has been found that the nitro group produces a greater effect than either the alkoxy or aryloxy group. This is especially so where the aryl nucleus contains, as sole substituents, a nitro group in ortho position to the azo group and a chlorine atom in para position to the azo group.

The compounds of our invention may be prepared by diazotizing a primary arylamine having a univalent non-metallic substituent in ortho position to the amino group undergoing diazotization and coupling the diazonium salt formed with a barbituric acid compound, capable of coupling in its 5-position, in an alkaline medium to form the desired azo derivative. Coupling may also be carried out in an acid or neutral medium but generally it is more satisfactory to conduct the coupling reaction in an alkaline medium as the reaction ordinarily proceeds more readily therein. Thus, compounds having the general Formula I can be prepared by diazotizing a primary arylamine having the characteristics above defined and coupling in an alkaline medium with a barbituric acid compound having the general formula:

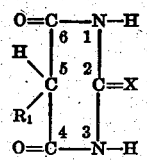

wherein X and $R_1$ have the meaning previously assigned to them.

Dye compounds represented by Formula I ordinarily color organic derivatives of cellulose shades ranging from greenish-yellow to orange-yellow but cause substantially no coloration on cotton or viscose. Because of the property just noted these dyes may be employed to produce cross-dyeing effects on fabrics, for example, containing an organic derivative of cellulose with either cotton or viscose or both cotton and viscose.

Nuclear sulfonated compounds corresponding to the unsulfonated azo compounds of the invention can be prepared by sulfonating in known manner the corresponding unsulfonated compounds. These nuclear sulfonated compounds have little or no utility for the coloration of organic derivatives of cellulose but may be employed to color cotton, wool, silk and regenerated cellulose by customary methods of application.

The preparation of the compounds having the general Formula I will be clear from the following representative examples illustrating their preparation. Unless otherwise indicated quantities are expressed in parts by weight.

EXAMPLE 1

13.8 grams of o-nitroaniline are dissolved in a mixture of 25 cc. of water and 25 cc. of 36% hydrochloric acid. The resulting solution is cooled and diazotized in the usual manner by the addition of a concentrated aqueous solution of 6.9 grams of sodium nitrite.

13.7 grams of cresidine are dissolved in 50 cc. of water containing 10 cc. of 36% hydrochloric acid, the solution is iced, and the diazonium solution prepared above is added with stirring. Upon completion of the coupling reaction the resulting brown paste is thinned with water, acidified further with 10 cc. of 36% hydrochloric acid and diazotized by the addition of a concentrated aqueous solution of 6.9 grams of sodium nitrite. The diazo solution resulting is added with stirring to 16.4 grams of barbituric acid dissolved in water containing sodium carbonate. After complete coupling the mixture is acidified and the dye formed recovered by filtration.

EXAMPLE 2

15.3 parts of β-hydroxy-o-ethoxyaniline,

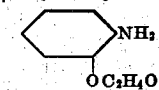

are dissolved in 200 parts of water and ice containing 25 parts of 36% hydrochloric acid and diazotized with 6.9 parts of sodium nitrite.

12.8 parts of barbituric acid are dissolved in 200 parts of water containing 31 parts of sodium carbonate. The resulting solution is cooled by the addition of ice and the diazo solution prepared as described above is added with stirring. When coupling is complete, the mixture is made neutral to litmus paper with acetic or hydrochloric acid and the dye is filtered, washed with water and dried.

EXAMPLE 3

16.7 parts of β-methoxy-o-phenetidine,

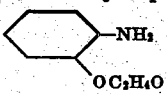

are diazotized in the usual manner with an aqueous solution of sodium nitrite.

12.8 parts of barbituric acid are dissolved in 200 parts of water containing 31 parts of sodium carbonate and coupled with the diazo solution prepared above in accordance with the method described in Example 2. The dye compound formed is recovered by filtration and subjected to any further purification desired.

EXAMPLE 4

*Preparation of 5-ethyl-5-(o-methoxy benzene azo) barbituric acid*

To a cooled solution of 12.3 grams of o-methoxyaniline in 200 cc. of water containing 30 cc. of 36% hydrochloric acid are added a concentrated aqueous solution of 6.9 grams of sodium nitrite. The diazo solution resulting is added gradually to an iced solution of 15.6 grams of 5-ethylbarbituric acid dissolved in water containing an excess of sodium hydroxide. After complete coupling the dye compound formed is precipitated out by adding an acid and is recovered by filtration.

Other 5-substituted barbituric acids are coupled in the same manner. By the substitution, for example, of 20.5 grams of 5-phenylbarbituric acid for 5-ethylbarbituric acid of the example, 5-phenyl-5-o-methoxybenzene azo barbituric acid may be prepared. Similarly, by the substitution of 22 grams of 5-benzylbarbituric acid for 5-ethylbarbituric acid, 5-benzyl-5-o-methoxybenzene azo barbituric acid may be prepared. As will be understood amines, other than o-methoxyaniline, may likewise be employed.

EXAMPLE 5

To a cooled solution of 12.3 grams of o-methoxyaniline in 200 cc. of water containing 30 cc. of 36% hydrochloric acid are added a concentrated aqueous solution of 6.9 grams of sodium nitrite. The resulting diazo solution is added gradually to an iced solution of 12.8 grams of barbituric acid dissolved in water containing an excess of sodium hydroxide. Upon completion of the coupling reaction, the dye is precipitated out of solution by the addition of acid and recovered by filtration.

A second class of compounds included within the scope of the invention and which may be employed for the dyeing of organic derivatives of cellulose has the general formula:

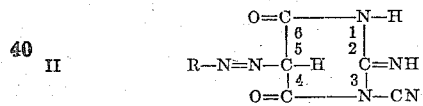

wherein R represents a nuclear non-sulfonated aryl nucleus having a univalent non-metallic substituent in the ortho position to the azo group. R may be further substituted and is advantageously an aryl nucleus of the benzene series.

The aryl azo compounds having the general formula just given produce dyeings on materials made of or containing organic derivatives of cellulose which are in general of good fastness to light and washing and range in shade from greenish-yellow to orange-yellow. Nuclear sulfonated azo compounds corresponding to the unsulfonated compounds having said general formula are not suitable for the coloration of organic derivatives of cellulose but may be employed for the coloration of cotton, wool, natural silk and regenerated cellulose by the customary methods of application. Said nuclear sulfonated azo compounds can be prepared by sulphonating the compounds of Formula II in known manner.

In general, the compounds of Formula II also color natural silk and wool but have very little affinity for cotton or viscose fibres. Because of their selective dyeing properties, these nuclear non-sulfonated compounds may be employed to produce cross dyeing effects on fabrics, for example, containing an admixture of an organic derivative of cellulose, natural silk or wool with cotton or viscose.

Further, the nuclear non-sulfonated aryl azo compounds represented by Formula II possess the advantage of being soluble in organic solvents such as acetone and cellosolve acetate, for example, and may be used to color lacquers, plastic masses and the like. In general, any solvent for cellulose acetate or more broadly for lacquer, plastic masses and the like, which is also a solvent for the dye compound, may be used.

The azo compounds represented by the general Formula II can be prepared by diazotizing an arylamine and reacting the diazonium salt formed with 2-imino-3-cyano-barbituric acid in an alkaline medium.

The following examples will illustrate the method of preparation of the azo compounds having the above formula. Quantities are expressed in parts by weight.

EXAMPLE 6

13.7 parts of o-phenetidine are dissolved in 200 parts of water containing about 36 parts of 36% hydrochloric acid. The resulting solution is cooled to a temperature approximating 0–5° C. by the addition of ice, for example, and diazotized by the addition of 6.9 parts of sodium nitrite dissolved in water.

13.8 parts of 2-imino-3-cyanobarbituric acid are dissolved in 300 parts of water containing 31.8 parts of sodium carbonate. The resulting solution is cooled and the diazo solution prepared above is slowly added with stirring. After coupling is complete, the alkaline mixture is made acid to litmus by the addition of acetic acid and the precipitated azo compound is filtered, washed and dried.

EXAMPLE 7

20.7 parts of 2,6-dichloro-4-nitroaniline are dissolved in 55 parts of 100% sulfuric acid and the resulting solution cooled. This solution is then mixed with a cold solution of 6.9 parts of sodium nitrite in 37 parts of 100% sulfuric acid. The resulting solution is further cooled externally and diluted by the addition of 105 parts of glacial acetic acid and cooled to 15° C. The mixture is stirred several hours until the diazotization is complete after which it is added to a cold solution of 13.8 parts of 2-imino-3-cyano-barbituric acid dissolved in 105 parts of glacial acetic acid. Sodium acetate is then added until the sulfuric acid present is neutralized. When coupling is complete, the desired azo compound is precipitated by the addition of water, filtered, washed and dried.

EXAMPLE 8

16.8 parts of o-methoxy-p-nitroaniline are suspended in 200 parts of water and 36 parts of 36% hydrochloric acid. The resulting mixture is cooled and diazotized in the usual manner by the addition of 6.9 parts of sodium nitrite dissolved in water.

13.8 parts of 2-imino-3-cyanobarbituric acid are dissolved in 300 parts of water containing 31.8 parts of sodium carbonate. The solution thus prepared is well cooled and the diazo solution prepared above slowly added thereto with stirring. After coupling is complete, the alkaline mixture is made acid to litmus with acetic acid and the precipitated azo compound filtered, washed and dried.

A third class of compounds included within the scope of the invention and which may be employed for the dyeing of organic derivatives of cellulose has the general formula:

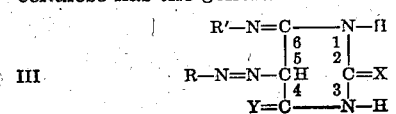

wherein R' represents hydrogen, an alkyl group or an aryl group, X represents oxygen, NH or sulfur, Y represents O or NR' and R is a nuclear non-sulfonated aryl nucleus having a univalent non-metallic substituent in the ortho position to the azo group. R may be further substituted and is advantageously, an aryl nucleus of the benzene series.

Compounds of the above formula may be prepared by coupling aryl diazonium salts having the characteristics previously described in an alkaline medium with compounds of the type represented by the formula:

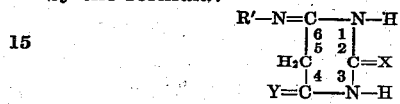

wherein X, Y and R' have the meaning previously assigned to them.

The compounds of Formula III color organic derivatives of cellulose shades ranging from yellow to red of good fastness to light and washing. The corresponding nuclear sulfonated compounds which may be prepared by sulfonating the compounds of Formula III can be employed to color cotton, natural silk or wool by customary methods of application. Said nuclear sulfonated compounds, however, possess little or no utility for coloring organic derivatives of cellulose.

The following examples illustrate the method of preparation of the azo compounds represented by the general Formula III. Quantities are expressed in parts by weight.

EXAMPLE 9

13.7 parts of o-phenetidine are dissolved in 200 parts of water containing about 36 parts of 36% hydrochloric acid. The resulting solution is cooled to a temperature approximating 0–5° C. by the addition of ice, for example, and diazotized by adding, with stirring, 6.9 parts of sodium nitrite dissolved in water.

12.7 parts of 6-iminobarbituric acid are dissolved in 300 parts of water containing 31.8 parts of sodium carbonate. The resulting solution is cooled and the diazo solution prepared above is added with stirring. Upon completion of the coupling reaction, the mixture is made slightly acid to litmus with acetic acid and the precipitated dye filtered, washed with water, and dried.

EXAMPLE 10

16.8 parts of o-methoxy-p-nitroaniline are added to 200 parts of water containing 36 parts of 36% hydrochloric acid. The mixture is iced and diazotized by adding, with stirring, 6.9 parts of sodium nitrite dissolved in water.

14 parts of 6-methyliminobarbituric acid are dissolved in 300 parts of water containing 31.8 parts of sodium carbonate and coupled in the usual manner with the diazo solution prepared as described above. When coupling is complete, the mixture is made slightly acid to litmus with acetic acid and the desired azo compound is recovered by filtration, washed with water, and dried.

EXAMPLE 11

16.8 parts of o-methoxy-p-nitroaniline are added to 200 parts of water containing about 36 parts of 36% hydrochloric acid and the mixture is diazotized in the usual manner by the addition of 6.9 parts of sodium nitrite dissolved in water.

14.3 parts of 6-iminothiobarbituric acid are dissolved in 300 parts of water containing 31.8 parts of sodium carbonate and coupled in the usual manner with the diazo solution prepared above.

Upon completion of the coupling reaction, the mixture is made slightly acid to litmus with acetic acid and the precipitated dye is filtered, washed with water and dried.

EXAMPLE 12

17.3 parts of o-nitro-p-chloroaniline are diazotized in the usual manner.

14.3 parts of 6-iminobarbituric acid are dissolved in a cold dilute aqueous solution of sodium hydroxide and the diazo solution prepared above is added with stirring. When coupling is complete, the mixture is made acid to litmus with acetic acid, for example, and the precipitated dye compound is filtered, washed with water and dried.

EXAMPLE 13

13.7 parts of o-phenetidine are dissolved in 200 parts of water containing about 36 parts of 36% hydrochloric acid. The resulting solution is cooled to a temperature approximating 0–5° C. by the addition of ice, for example, and diazotized by adding, with stirring, 6.9 parts of sodium nitrite dissolved in water.

12.6 parts of 4,6-diiminobarbituric acid are dissolved in 300 parts of water containing 31 parts of sodium carbonate. The resulting solution is cooled and the diazo solution prepared above is added with stirring. When coupling is complete the mixture is made acid to litmus with acetic acid and the precipitated dye is recovered by filtration, washed with water and dried.

EXAMPLE 14

16.8 parts of o-methoxy-p-nitroaniline are added to 200 parts of water containing 36 parts of 36% hydrochloric acid. The mixture is iced and diazotized by adding, with stirring, 6.9 parts of sodium nitrite dissolved in water.

14.3 parts of 6-iminothiobarbituric acid are dissolved in 300 parts of water containing 30 parts of sodium carbonate. The resulting solution is cooled and the diazo solution prepared above is added with stirring. Upon completion of the coupling reaction, the mixture is made slightly acid to litmus with acetic acid and the precipitated dye filtered, washed with water, and dried.

EXAMPLE 15

20.7 parts of 2,6-dichloro-4-nitroaniline are dissolved in 55 parts of 100% sulfuric acid and the resulting solution cooled. This solution is mixed with a cooled solution of 6.9 parts of sodium nitrite in 37 parts of 100% sulfuric acid. The resulting solution is further cooled externally and then diluted by the addition of 105 parts of glacial acetic acid and cooled to 15° C. The mixture is stirred until diazotization is complete, usually several hours, after which it is added to a cooled solution of 12.7 parts of 6-iminobarbituric acid dissolved in 105 parts of glacial acetic acid. Sodium acetate is then added until the sulfuric acid present is neutralized. When coupling is complete, the dye compound formed is precipitated by the addition of water after which it is filtered, washed and dried.

A further class of compounds included within the scope of our invention and which may be employed for the coloration of organic derivatives of cellulose has the general formula:

IV
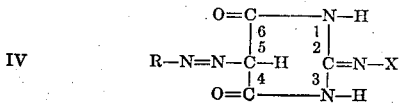

wherein X represents hydrogen or an alkyl group and R is a nuclear non-sulfonated aryl nucleus having a univalent non-metallic substituent in the ortho position to the azo group. R may be further substituted and is advantageously an aryl nucleus of the benzene series.

Compounds having the general Formula IV can be prepared by coupling aryl diazonium salts, having a univalent non-metallic substituent in the ortho position to the azo group, in an alkaline medium with 2-iminobarbituric acid or 2-alkyliminobarbituric acid. These compounds can be represented by the formula:

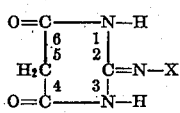

wherein X represents hydrogen or an alkyl group.

The term "alkyl" as used above is intended to include non-substituted alkyl groups, such as methyl, ethyl, propyl, etc., as well as substituted alkyl groups, except as otherwise indicated, such as —$C_2H_4OH$, —$C_3H_6OH$ and —$C_2H_4Cl$, for example.

The compounds of Formula IV color organic derivatives of cellulose shades ranging from greenish-yellow to red of good fastness to light and washing. The corresponding nuclear sulfonated azo compounds, which can be prepared by sulfonating the compounds of Formula IV, possess little or no utility for the coloration of organic derivatives of cellulose but may be employed for the coloration of cotton, natural silk or wool by customary methods of application.

The following examples illustrate the method of preparation of the azo compounds having the general Formula IV. Quantities are expressed in parts by weight.

EXAMPLE 16

13.7 parts of o-phenetidine are dissolved in 200 parts of water containing about 36 parts of 36% hydrochloric acid. The resulting solution is cooled to a temperature approximating 0–5° C. by the addition of ice, for example, and diazotized in the usual manner by the addition of 6.9 parts of sodium nitrite dissolved in water.

12.7 parts of 2-iminobarbituric acid are dissolved in 300 parts of water containing 31.8 parts of sodium carbonate and coupled in the usual manner with the diazonium solution prepared above. Upon completion of the coupling reaction, the mixture is made acid to litmus with acetic acid and the precipitated azo compound is filtered, washed with water, and dried.

EXAMPLE 17

16.8 parts of o-methoxy-p-nitroaniline are added to 200 parts of water containing about 36 parts of 36% hydrochloric acid. The mixture is iced and diazotized in the usual manner by adding with stirring 6.9 parts of sodium nitrite dissolved in water.

14 parts of 2-methyliminobarbituric acid are dissolved in 300 parts of water containing 31.8 parts of sodium carbonate. The resulting solution is cooled and the diazo solution prepared as described above is added with stirring. When coupling is complete, the mixture is made acid to litmus with acetic acid and the precipitated dye compound is filtered, washed with water, and dried.

EXAMPLE 18

15.8 parts of o-nitro-p-chloraniline are added to 200 parts of water containing about 36 parts of 36% hydrochloric acid. The mixture is iced and diazotized in the usual manner by adding with stirring 6.9 parts of sodium nitrite dissolved in water.

14.1 parts of 2-methyliminobarbituric acid are dissolved in 300 parts of water containing 30 parts of sodium carbonate. The resulting solution is cooled by the addition of ice, for example, and the diazo solution prepared as described above is added with stirring. When coupling is complete, the mixture is made neutral to Congo red paper by the addition of acetic acid and the desired azo compound is recovered by filtration, washed with water, and dried.

EXAMPLE 19

15.4 parts of o-nitro-p-methoxyaniline are diazotized and coupled with 15.9 parts of 2-ethyliminobarbituric acid dissolved in a dilute aqueous solution of sodium carbonate. The dye compound formed is recovered by filtration and subjected to any further treatment desired.

2-β-hydroxyethyliminobarbituric acid, for example, may be substituted for 2-ethyliminobarbituric acid in the above example.

In order that our invention may be fully understood, the preparation of a number of substances used in the manufacture of the azo compounds employed in the process of our invention is described hereinafter. For purposes of clarity the number of the formula is given immediately preceding the disclosure of the preparation of those substances useful in connection with the manufacture of the compounds of said formula.

FORMULA I 5-ethyl barbituric acid 5.8 grams of sodium are dissolved in 125 cc. of dry ethyl alcohol and a hot absolute ethyl alcohol solution of 47 grams of ethyl diethyl malonate and 15 grams of urea are added. The resulting mixture is refluxed for seven hours, cooled and filtered. 5-ethyl barbituric acid separates on acidifying the filtrate with hydrochloric acid and may be recovered by filtration.

5-ethyl thiobarbituric acid

This compound may be prepared according to the method described for 5-ethyl barbituric acid by substituting a molecular equivalent weight of thiourea for urea.

5-benzyl and 5-phenyl barbituric acid

These compounds may be prepared in a similar manner to that described for 5-ethyl barbituric acid by substituting equivalent molecular proportions of benzyl diethyl malonate and phenyl diethyl malonate, respectively, for ethyl diethyl malonate. Other aralkyl and aryl barbituric acids may be prepared in similar fashion by the use of the corresponding aralkyl or aryl diethyl malonate.

5-benzyl and 5-phenyl thiobarbituric acid

These compounds may be prepared in a similar manner to that described for 5-ethyl thiobarbituric acid by substituting equivalent molecular proportions of benzyl diethyl malonate and phenyl diethyl malonate, respectively, for ethyl diethyl malonate. Other aralkyl and aryl thiobarbituric acids may be prepared in similar fashion by the use of the corresponding aralkyl or aryl diethyl malonate.

FORMULA II 2-imino-3-cyanobarbituric acid 23 grams of sodium are dissolved in 200 cc. of anhydrous ethanol and 160 grams of ethyl malonate are added following which 46 grams of dicyandiamide are added. The reaction mixture is heated on a steam bath at 80° C. for about 10 hours and the resulting mixture poured into 2500 cc. of cold water and neutralized with dilute hydrochloric acid. The 2-imino-3-cyanobarbituric acid that separates is filtered, washed with water and dried.

FORMULA III

6-iminobarbituric acid 4.6 grams of sodium are dissolved in 100 cc. of absolute ethanol and 11.3 grams of ethyl cyano acetate and 6.5 grams of urea are added. The mixture is heated at 70–80° C. for about 5 hours and the sodium salt resulting is filtered, washed with alcohol and dissolved in a minimum amount of water. 6-iminobarbituric acid is precipitated by adding hydrochloric acid to the aqueous solution of its sodium salt until the solution is acid to Congo red paper, recovered by filtration, washed with water and dried.

6-iminothiobarbituric acid

This compound is prepared in the same manner as 6-iminobarbituric acid, except that an equivalent amount of thiourea is substituted for urea.

FORMULA IV

2-methyliminobarbituric acid

To a solution of 9 grams of sodium in 150 cc. of dry ethanol are added 36 grams of diethylmalonate and 23.4 grams of methyliminourea (methyl guanidine) carbonate. The mixture is refluxed for 5 hours, after which it is filtered and the precipitate washed with a small amount of ethanol. The sodium salt thus obtained is dissolved in a small volume of water and the resulting solution acidified to Congo red paper by the addition of hydrochloric acid. 2-methyliminobarbituric acid separates on cooling and is recovered by filtration, washed and dried.

2-iminobarbituric acid

This compound can be prepared as described in Liebig's Annalen, vol. 335, page 352 (1904) or Berichte der Deutschen Chemischen Gesellschaft, vol. 26, page 2553 (1893).

2-ethyliminobarbituric acid

To a solution of 9 grams of sodium in 150 cc. of dry ethanol are added 36 grams of ethyl malonate and 26.5 grams of ethyliminourea carbonate (ethyl guanidine). The mixture is refluxed for 5 hours, after which it is filtered and the precipitate washed with ethyl alcohol. The sodium salt thus obtained is dissolved in a small volume of water, and the resulting solution acidified to Congo red paper by means of hydrochloric acid to precipitate 2-ethyliminobarbituric acid. The desired product separates on cooling and is recovered by filtration, washed and dried.

Ethyliminourea carbonate may be prepared as described in Science Papers Institute Physical Chemical Research (Tokyo), vol. 16, pages 306–309, 24–28 (1931).

2-β-hydroxy ethyliminobarbituric acid

To a solution of 9 grams of sodium in 150 cc. of dry ethanol are added 36 grams of ethyl malonate and 29.2 grams of β-hydroxy ethyliminourea carbonate (prepared as described in the above reference). The mixture is refluxed for 5 hours, after which it is filtered and the precipitate washed with ethyl alcohol. The sodium salt thus obtained is dissolved in a small volume of water and the resulting solution acidified to Congo red paper by means of hydrochloric acid to precipitate 2-β-hydroxyethyliminobarbituric acid. The desired product separates on cooling and is recovered by filtration, washed and dried.

The following tabulations further illustrate the compounds employed in the process of our invention together with the color they produce on cellulose acetate silk. The compounds indicated below may be prepared by diazotizing the amines listed under the heading "Amine" and coupling with the compounds specified in the column entitled "Coupling component." The diazotization and coupling reactions may, for example, be carried out in accordance with the general procedure disclosed in the examples illustrating the preparation of compounds employed in the process of the invention.

COMPOUNDS REPRESENTED BY FORMULA I

| Coupling component | Amine | Color on cellulose acetate silk |
|---|---|---|
| Barbituric acid | o-Nitroaniline | Greenish-yellow. |
| Do | o-Methoxy aniline | Do. |
| Do | 1-amino-2, 4-dinitrobenzene | Do. |
| Do | 2, 6-dimethylaniline | Do. |
| Do | o-Ethoxy aniline | Do. |
| Do | o-Chloroaniline | Do. |
| Do | o-Methylaniline | Do. |
| Do | 1-amino-3-chlor-6-hydroxy benzene | Do. |
| Do | 1-amino-3-chlor-6-methoxy benzene | Do. |
| Do | o-Methoxy-p-nitroaniline | Do. |
| Thiobarbituric acid | o-Methoxy aniline | Do |
| Do | o-Methylaniline | Do. |
| Do | o-Ethoxyaniline | Do. |
| Do | o-Nitroaniline | Do. |
| 5-phenyl barbituric acid | o-Methoxyaniline | Do. |
| 5-phenyl (p-chlor) barbituric acid | o-Ethoxaniline | Do. |
| Barbituric acid | o-Propoxyaniline | Do. |
| Do | o-β-Methoxy ethoxy ($OC_2H_4OCH_3$) aniline | Do. |
| Do | o-Phenoxyaniline | Do. |
| Do | o-Ethoxy-p-chloroaniline | Do. |
| Do | o-Methoxy-p-methylaniline | Do. |
| Do | o-β-hydroxyethoxy ($OC_2H_4OH$) aniline | Do. |
| Do | o-Nitro-p-chloroaniline | Do. |
| Thiobarbituric acid | o-Nitroaniline | Orange. |
| Do | o-Nitro-p-chloroaniline | Do. |
| Do | o-Nitro-p-bromoaniline | Do. |
| Do | o-Nitro-p-fluoroaniline | Do. |
| Do | o-Nitro-p-methylaniline | Do. |
| Do | o-Nitro-p-methoxyaniline | Do. |

Compounds Represented by Formula II

| Coupling component | Amine | Color on cellulose acetate silk |
|---|---|---|
| 2-imino-3-cyano-barbituric acid | o-Anisidine | Greenish-yellow. |
| Do | o-Nitroaniline | Yellow. |
| Do | 2-methoxy-4-nitroaniline | Golden-yellow. |
| Do | o-Chloroaniline | Greenish-yellow. |
| Do | 2,6-dichloro-4-nitroaniline | Orange-yellow. |
| Do | 2-nitro-4-chloroaniline | Do. |

Compounds Represented by Formula III

| Coupling component | Amine | Color on cellulose acetate silk |
|---|---|---|
| 6-alkyliminobarbituric acid | o-Anisidine | Greenish-yellow. |
| 6-iminobarbituric acid | o-Chloroaniline | Do. |
| Do | o-Methoxy-p-nitroaniline | Golden yellow. |
| 6-alkyliminobarbituric acid | ...do | Do. |
| 6-iminobarbituric acid | o-β-hydroxyethoxyaniline | Orange-yellow. |
| Do | o-Nitroaniline | Golden-yellow. |
| 6-methyliminobarbituric acid | ...do | Do. |
| 6-iminothiobarbituric acid | ...do | Do. |
| 6-methyliminothiobarbituric acid | ...do | Do. |
| 6-iminobarbituric acid | o-Nitro-p-chloroaniline | Do. |
| 6-iminothiobarbituric acid | ...do | Do. |
| 6-methyliminothiobarbituric acid | ...do | Do. |
| 6-iminobarbituric acid | 2-nitro-4,6-dichloroaniline | Do. |
| 6-methyliminobarbituric acid | ...do | Do. |
| 6-iminothiobarbituric acid | ...do | Do. |
| 6-methyliminothiobarbituric acid | ...do | Do. |
| 6-iminobarbituric acid | 2,6-dinitro-4-chloroaniline | Do. |
| 6-methyliminobarbituric acid | ...do | Do. |
| 6-iminothiobarbituric acid | ...do | Do. |
| 6-methyliminothiobarbituric acid | ...do | Do. |
| 6-iminobarbituric acid | o-Nitro-p-alkylaniline | Do. |
| 6-methyliminobarbituric acid | ...do | Do. |
| 6-iminothiobarbituric acid | ...do | Do. |
| 6-methyliminothiobarbituric acid | ...do | Do. |
| 6-alkyliminobarbituric acid | o-Chloroaniline | Greenish yellow. |
| 6-iminobarbituric acid | o-Anisidine | Golden yellow. |
| 6-iminobarbituric acid | o-Nitro-p-alkoxyaniline | Do. |
| 6-methyliminobarbituric acid | ...do | Do. |
| 6-iminothiobarbituric acid | ...do | Do. |
| 6-methyliminothiobarbituric acid | ...do | Do. |
| 6-iminobarbituric acid | 2-nitro-1-amino-4-phenylmethylsulfone | Do. |
| 6-methyliminobarbituric acid | ...do | Do. |
| 6-iminothiobarbituric acid | ...do | Do. |
| 6-methyliminothiobarbituric acid | ...do | Do. |
| 6-iminothiobarbituric acid | o-Chloroaniline | Yellow. |
| 4,6-diiminobarbituric acid | o-Anisidine | Do. |
| Do | o-Chloroaniline | Do. |
| Do | o-Bromoaniline | Orange-yellow. |
| Do | o-Toluidine | Yellow. |
| Do | 2,4-dichloroaniline | Do. |
| Do | 2,5-dichloroaniline | Orange-yellow. |
| Do | o-Nitro-p-chloroaniline | Do. |
| Do | 4-nitro-2-methoxyaniline | Do. |
| Do | 2-methyl-4-nitroaniline | Do. |
| Do | 3-nitro-4-aminotoluene | Do. |
| 4,6-diiminothiobarbituric acid | o-Anisidine | Do. |
| Do | o-Chloroaniline | Do. |
| Do | o-Bromoaniline | Do. |
| Do | o-Toluidine | Yellow. |
| Do | 2,4-dichloroaniline | Orange-yellow. |
| Do | 2,5-dichloroaniline | Do. |
| Do | o-Nitro-p-chloroaniline | Do. |
| Do | 4-nitro-2-methoxyaniline | Do. |
| Do | 2-methyl-4-nitroaniline | Do. |
| Do | 3-nitro-4-aminotoluene | Do. |
| 6-iminobarbituric acid | o-Anisidine | Yellow. |
| Do | o-Chloroaniline | Do. |
| Do | o-Bromoaniline | Do. |
| Do | o-Toluidine | Do. |
| Do | 2,4-dichloroaniline | Do. |
| Do | 2,5-dichloroaniline | Do. |
| Do | o-Nitro-p-chloroaniline | Orange-yellow. |
| Do | 4-nitro-2-methoxyaniline | Do. |
| Do | 2-methyl-4-nitroaniline | Do. |
| Do | 3-nitro-4-aminotoluene | Do. |
| 2,4-diiminobarbituric acid | o-Anisidine | Yellow. |
| Do | o-Chloroaniline | Do. |
| Do | o-Bromoaniline | Do. |
| Do | o-Toluidine | Do. |
| Do | 2,4-dichloroaniline | Do. |
| Do | 2,5-dichloroaniline | Do. |
| Do | o-Nitro-p-chloroaniline | Do. |
| Do | 4-nitro-2-methoxyaniline | Do. |
| Do | 2-methyl-4-nitroaniline | Orange-yellow. |
| Do | 3-nitro-4-aminotoluene | Do. |

Compounds Represented by Formula IV

| Coupling component | Amine | Color on cellulose acetate silk |
|---|---|---|
| 2-iminobarbituric acid | o-Anisidine | Greenish-yellow. |
| Do | o-Nitroaniline | Yellow. |
| Do | o-Methoxy-p-nitroaniline | Golden-yellow. |
| Do | o-Chloroaniline | Greenish-yellow. |
| 2-methyliminobarbituric acid | o-Anisidine | Do. |
| Do | o-Methoxy-p-nitroaniline | Golden-yellow. |

In employing the aryl azo derivatives of our invention as dyes, they will ordinarily be applied to the material in the form of an aqueous suspension which can be prepared by grinding the dye to a paste in the presence of sulfonated oil, soap, or other suitable dispersing agent and dispersing the resulting paste in water. Dyeing operations can, with advantage, be conducted at a temperature of 80–85° C., but any suitable temperature may be used. In accordance with the usual dyeing practice, the material to be dyed will ordinarily be added to the aqueous dye bath at a temperature lower than that at which the main portion of the dyeing is to be effected, a temperature approximating 45–55° C., for example, following which the temperature of the dye bath will be raised to that selected for carrying out the dyeing operation. The temperature at which the dyeing is conducted will vary somewhat, depending, for example, on the particular material or materials undergoing coloration.

The amount of dispersing agent employed may be varied over wide limits. Amounts approximating 10 to 20% by weight on the dye may be employed, for example. These amounts are not to be taken as limits as greater or lesser amounts can be used. To illustrate, if the dye is ground to a sufficiently fine powder dyeing can be satisfactorily carried out without the aid of a dispersing agent. Generally speaking, however, the use of a dispersing agent is desirable.

Advantageously, dyeing is carried out in a substantially neutral dyebath. Perhaps, more accurately, it should be stated that dyeing should not be carried out in an alkaline dyebath, that is, one having any substantial alkalinity, since the presence of free alkali appears to affect the dyeing adversely. Dyeing in an acid dyebath is not recommended because of the tendency of acids to affect the material undergoing dyeing adversely. Because of these considerations when a dispersing agent is to be employed preferably it is neutral or substantially neutral.

It will be understood that the azo compounds of our invention may be applied to the material to be colored in any suitable manner. Coloration may be effected, for example, by dyeing, printing, or stenciling. Dispersing or solubilizing agents that can be employed for preparing suspensions of the dye include soap, sulphoricinoleic acid, salts of sulphoricinoleic acid, a water soluble salt of cellulose phthalate, cellulose succinate or cellulose mono-acetate diphthalate, for example, the sodium, potassium or ammonium salts, and sulfonated oleic, stearic or palmitic acid, or salts thereof, such, for example, as the sodium or ammonium salts.

While it is preferred to effect coloration by applying the dye compound from an aqueous dye bath directly to the material to be colored, the azo compounds of our invention may be applied employing the methods applicable to the so-called ice colors. Briefly, in accordance with this method of dyeing, the amine is absorbed and diazotized on the fiber, after which the dye is formed in situ by developing with a coupling component such as barbituric acid, thiobarbituric acid, 2-imino-3-cyanobarbituric acid, 6-iminobarbituric acid, 2-iminobarbituric acid or 2-alkyl-iminobarbituric acid, for example. Conversely the material undergoing dyeing or coloration may first be treated to absorb one of said coupling components and the dye subsequently formed in situ by coupling with an aryl diazonium salt.

The following examples illustrate how dyeing may be carried out in accordance with our invention. Unless otherwise indicated, the quantities in the following examples are expressed in parts by weight.

EXAMPLE A 25 pounds of cellulose acetate in the form of taffeta are dyed on the jig, using 0.2 pound of o-methoxybenzeneazo barbituric acid dispersed in 70 gallons of water as the dye solution. The cloth is entered and passed twice through the solution at 100° F., and then the temperature is gradually raised to 200° F. and dyeing continued for one hour. The cloth is colored a greenish-yellow shade of excellent fastness to light.

EXAMPLE B 2.5 parts of the compound formed by coupling 2-imino-3-cyanobarbituric acid with o-anisidine are finely ground with soap and dispersed in 1000 parts of water. The dispersion thus prepared is heated to a temperature approximating 45–55° C. and 100 parts of cellulose acetate silk, in the form of taffeta or threads, for example, are added to the dye bath after which the temperature is gradually raised to 80–85° C. and the silk worked for several hours at this latter temperature. Upon completion of the dyeing operation, the cellulose acetate silk is removed, washed with soap, rinsed and dried. The cellulose acetate silk is dyed a greenish-yellow shade.

EXAMPLE C 2.5 parts of the dye compound formed by coupling diazotized o-anisidine with 6-iminobarbituric acid in an alkaline medium are finely ground with soap and dispersed in 1000 parts of water. The dispersion thus prepared is heated to a temperature approximating 45–55° C. and 100 parts of cellulose acetate silk, in the form of taffeta or threads, for example, are added to the dye bath, after which the temperature is gradually raised to 80–85° C. and the silk worked for several hours at this latter temperature. Upon completion of the dyeing operation, the cellulose acetate silk is removed, washed with soap, rinsed and dried. The cellulose acetate silk is dyed a greenish-yellow shade.

EXAMPLE D 2.5 parts of the compound formed by coupling 2-iminobarbituric acid with o-phenetidine in an alkaline medium are finely ground with soap and dispersed in 1000 parts of water. The dispersion thus prepared is heated to a temperature approximating 45–55° C. and 100 parts of cellulose acetate silk, in the form of taffeta or threads, for example, are added to the dyebath, after which the temperature is gradually raised to 80–85° C. and the silk worked for several hours at this latter temperature. Upon completion of the dyeing operation, the cellulose acetate silk is removed, washed with soap rinsed and dried. The cellulose acetate silk is dyed a greenish-yellow shade.

While our invention has been illustrated in connection with the dyeing of cellulose acetate silk it will be understood that dyeing operations can be carried out in a manner similar to that described above by the substitution of another organic derivative of cellulose material for cellulose acetate silk or by employing dye compounds other than those employed in the examples, or by substitution of both the material being dyed and the dye compounds of the examples.

We claim:

1. An aryl azo compound having the general formula:

A—N=N—B wherein A represents an aryl nucleus having an alkoxy group in ortho position to the azo group and B represents a member selected from the group consisting of barbituric acid and substituted barbituric acids.

2. An aryl azo compound having the general formula:

A—N=N—B wherein A represents an aryl nucleus having an aryloxy group in ortho position to the azo group and B represents a member selected from the group consisting of barbituric acid and substituted barbituric acids.

3. An aryl azo compound having the general formula:

A—N=N—B wherein A represents an aryl nucleus of the benzene series having an alkoxy group in ortho position to the azo group and B represents a member selected from the group consisting of barbituric acid and substituted barbituric acids.

4. An aryl azo compound having the general formula:

A—N=N—B wherein A represents an aryl nucleus of the benzene series having a phenoxy group in ortho position to the azo group and B represents a member selected from the group consisting of barbituric acid and substituted barbituric acids.

5. An azo compound having the general formula:

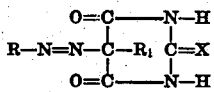

wherein X represents oxygen or sulfur, R₁ represents hydrogen, an alkyl group, an aralkyl group or a nuclear non-sulfonated aryl group and R represents a nuclear non-sulfonated aryl nucleus having an aryloxy group in ortho position to the azo group.

6. An azo compound having the general formula:

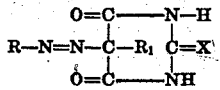

wherein X represents oxygen or sulfur, R₁ represents hydrogen, an alkyl group, an aralkyl group or a nuclear non-sulfonated aryl group and R represents a nuclear non-sulfonated aryl nucleus having an aryloxy group in ortho position to the azo group.

7. An azo compound having the general formula:

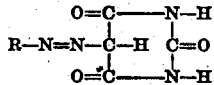

wherein R represents a nuclear non-sulfonated aryl nucleus of the benzene series having an alkoxy group in ortho position to the azo group.

8. An azo compound having the general formula:

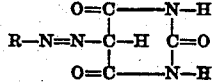

wherein R represents a nuclear non-sulfonated aryl nucleus of the benzene series having an aryloxy group in ortho position to the azo group.

9. The process of coloring an organic derivative of cellulose which comprises applying thereto a nuclear non-sulfonated dye having the general formula:

A—N=N—B wherein A represents an aryl nucleus of the benzene series having a non-metallic univalent substituent selected from the group consisting of a nitro group, an alkyl group, an alkoxy group, an aryloxy group and a halogen atom in ortho position to the azo group, and B represents a nucleus selected from the group consisting of barbituric acid and substituted barbituric acids.

10. The process of coloring an organic derivative of cellulose which comprises applying thereto a nuclear non-sulfonated dye having the general formula:

A—N=N—B wherein A represents an aryl nucleus having a non-metallic univalent substituent selected from the group consisting of a nitro group, an alkyl group, an alkoxy group, an aryloxy group and a halogen atom in the ortho position to the azo group and B represents a nucleus selected from the group consisting of barbituric acid and substituted barbituric acids.

11. The process of coloring an organic derivative of cellulose which comprises applying thereto a dye having the general formula:

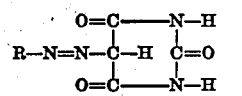

wherein R represents a nuclear non-sulfonated aryl nucleus of the benzene series having a non-metallic univalent substituent selected from the group consisting of a nitro group, an alkyl group, an alkoxy group, an aryloxy group and a halogen atom in the ortho position to the azo group.

12. The process of coloring an organic derivative of cellulose which comprises applying thereto a nuclear non-sulfonated dye having the general formula:

A—N=N—B wherein A represents an aryl nucleus of the benzene series having an alkoxy group in the ortho position to the azo group and B represents a nucleus selected from the group consisting of barbituric acid and substituted barbituric acids.

13. The process of coloring an organic derivative of cellulose which comprises applying thereto a nuclear non-sulfonated dye having the general formula:

A—N=N—B wherein A represents an aryl nucleus of the benzene series having an aryloxy group in the ortho position to the azo group and B represents a nucleus selected from the group consisting of barbituric acid and substituted barbituric acids.

14. The process of coloring an organic derivative of cellulose which comprises applying thereto a dye having the general formula:

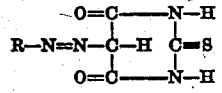

wherein R represents a nuclear non-sulfonated aryl nucleus of the benzene series having a nitro group in the ortho position to the azo group.

15. The process of coloring an organic acid ester of cellulose which comprises applying thereto a nuclear non-sulfonated dye having the general formula:

A—N=N—B wherein A represents an aryl nucleus of the benzene series having a non-metallic univalent substituent selected from the group consisting of a nitro group, an alkyl group, an alkoxy group, an aryloxy group and a halogen atom in the ortho position to the azo group and B represents a nucleus selected from the group consisting of barbituric acid and substituted barbituric acids.

16. The process of coloring an organic acid ester of cellulose which comprises applying thereto a nuclear non-sulfonated dye having the general formula:

A—N=N—B wherein A represents an aryl nucleus of the benzene series having an alkoxy group in the ortho position to the azo group and B represents a nucleus selected from the group consisting of barbituric acid and substituted barbituric acids.

17. The process of coloring an organic acid ester of cellulose which comprises applying thereto a nuclear non-sulfonated dye having the general formula:

A—N=N—B wherein A represents an aryl nucleus of the benzene series having an aryloxy group in the ortho position to the azo group and B represents a nucleus selected from the group consisting of barbituric acid and substituted barbituric acids.

18. The process of coloring an organic acid ester of cellulose which comprises applying thereto a dye having the general formula:

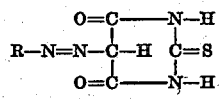

wherein R represents a nuclear non-sulfonated aryl nucleus of the benzene series having a nitro group in the ortho position to the azo group.

19. The process of coloring a cellulose acetate which comprises applying thereto a nuclear non-sulfonated dye having the general formula:

A—N=N—B wherein A represents an aryl nucleus of the benzene series having a non-metallic univalent substituent selected from the group consisting of a nitro group, an alkyl group, an alkoxy group, an aryloxy group and a halogen atom in the ortho position to the azo group and B represents a nucleus selected from the group consisting of barbituric acid and substituted barbituric acids.

20. The process of coloring a cellulose acetate which comprises applying thereto a dye having the general formula:

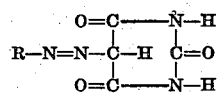

wherein R represents a neuclear non-sulfonated aryl nucleus of the benzene series having a non-metallic univalent substituent selected from the group consisting of a nitro group, an alkyl group, an alkoxy group, an aryloxy group and a halogen atom in the ortho position to the azo group.

21. The process of coloring a cellulose acetate which comprises applying thereto a nuclear non-sulfonated dye having the general formula:

A—N=N—B wherein A represents an aryl nucleus of the benzene series having an alkoxy group in the ortho position to the azo group and B represents a nucleus selected from the group consisting of barbituric acid and substituted barbituric acids.

22. The process of coloring a cellulose acetate which comprises applying thereto a dye having the general formula:

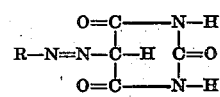

wherein R represents a nuclear non-sulfonated aryl nucleus of the benzene series having an alkoxy group in the ortho position to the azo group.

23. The process of coloring a cellulose acetate which comprises applying thereto a nuclear non-sulfonated dye having the general formula:

A—N=N—B wherein A represents an aryl nucleus of the benzene series having an aryloxy group in the ortho position to the azo group and B represents a nucleus selected from the group consisting of barbituric acid and substituted barbituric acids.

24. The process of coloring a cellulose acetate which comprises applying thereto a dye having the general formula:

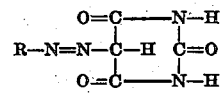

wherein R represents a nuclear non-sulfonated aryl nucleus of the benzene series having an aryloxy group in the ortho position to the azo group.

JAMES G. McNALLY.
JOSEPH B. DICKEY.

CERTIFICATE OF CORRECTION.

Patent No. 2,140,537. December 20, 1938.

JAMES G. McNALLY, ET AL.

It is hereby certified that error appears in the printed specification of the above numbered patent requiring correction as follows: Page 9, first column, line 46, claim 5, for the word "aryloxy" read alkoxy; and that the said Letters Patent should be read with this correction therein that the same may conform to the record of the case in the Patent Office.

Signed and sealed this 18th day of April, A. D. 1939.

Henry Van Arsdale (Seal) Acting Commissioner of Patents.